United States Patent [19]

Mims

[11] 3,899,116

[45] Aug. 12, 1975

[54] METHOD OF VIBRATORY WELDING
[75] Inventor: Bruce L. Mims, Redding, Conn.
[73] Assignee: Branson Ultrasonics Corporation, New Canaan, Conn.
[22] Filed: Nov. 29, 1974
[21] Appl. No.: 528,271

[52] U.S. Cl. .............................................. 228/110
[51] Int. Cl.[2] .......................................... B23K 1/06
[58] Field of Search .......... 228/1, 3; 29/470.1, 505, 29/521

[56] References Cited
UNITED STATES PATENTS
3,367,809   2/1968   Soloff ................................. 228/1 X
3,609,851   10/1971  McMaster .......................... 228/1 X Primary Examiner—Donald G. Kelly
Assistant Examiner—Margaret M. Joyce
Attorney, Agent, or Firm—Ervin B. Steinberg

[57] ABSTRACT

The invention refers to a method for welding together two terminations by means of vibratory energy with the aim of improving the peel strength of the resulting weld over welds made by the methods known heretofore. An aperture is provided in one termination which is then superposed over the other termination. Both terminations are positioned between an anvil and vibratory tool. During the welding cycle the material of the non-apertured termination penetrates into the aperture of the apertured termination. In this manner, a weld is made which has a peel strength higher than the welds made by prior methods.

10 Claims, 2 Drawing Figures

METHOD OF VIBRATORY WELDING

BRIEF SUMMARY OF THE INVENTION

This invention refers to a method for welding together two terminations comprising dissimilar metals by means of vibratory energy. The method of welding by vibratory high frequency energy is disclosed in U.S. Pat. Nos. 2,946,119 and 2,946,120 of J. B. Jones et al., dated July 26, 1960. An improved apparatus for vibratory welding is disclosed in U.S. Pat. No. 3,752,380 of A. Shoh, dated Aug. 14, 1973, which patents are included herein by reference.

Vibratory welding comprises holding two metal workpieces to be joined in intimate contact by means of a clamping force and applying to one of the workpieces vibratory energy in a direction substantially perpendicular to the applied clamping force. The result is a non-fusion metallurgical bond at the interface between the workpieces. The vibratory energy supplied generally is in the sonic or ultrasonic frequency range, and most commonly is in the range between 1 to 100 kHz.

The present invention concerns a method for welding together two electrical terminations made of the same or dissimilar metals with the aim of improving the peel strength of the resulting weld over the welds made by the methods known heretofore. The present method is especially useful for welding together metals of different hardness. Specifically, the method is most advantageous when welding copper and aluminum, although terminations involving other metal combinations may be used.

Using heretofore known methods of welding terminations, particularly those comprising dissimilar metals, result in welds having high shear strength but relatively low peel strength.

In the present method, an aperture is provided in the termination of the harder metal. The two terminations are then superposed upon one another and the assembly is placed between a tool or horn of a vibratory apparatus and a stationary anvil, see A. Shoh, supra. A static clamping force is applied with the apertured termination disposed in abutting contact with the frontal surface of the tool. The tool imparts vibratory motion to the workpieces in a direction perpendicular to the applied clamping force and during the ensuing weld cycle, the softer metal extrudes into the aperture and the head of the metal flowing through the aperture is flattened by the action of the vibrating tool's frontal surface. In this manner, a weld is made between two metallic terminations of different hardness which has a higher peel strength than the welds made by prior methods.

A principal object of the present invention, therefore, is the provision of a method of welding metallic terminations.

Another principal object of the present invention is a method for improving the peel strength of a weld comprising two metallic terminations of different hardness.

Other and further features of the present invention will become more clearly apparent by reference to the following description when taken in conjunction with the accompanying drawings.

DETAILED DESCRIPTION OF THE INVENTION

Figure 1:
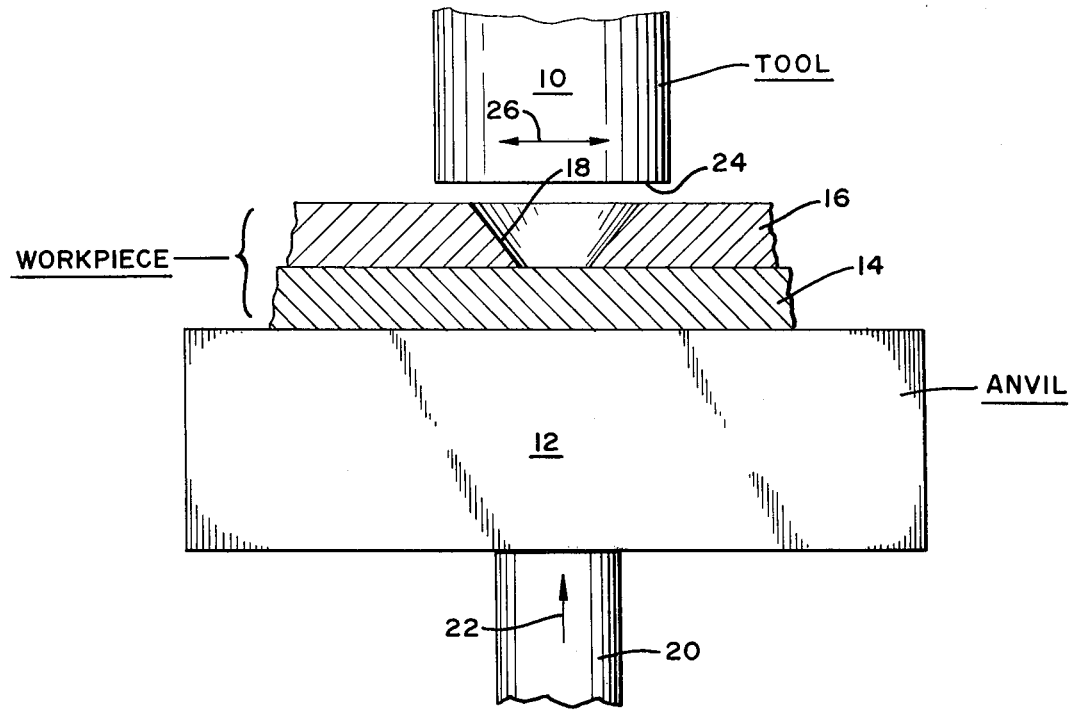
FIG. 1 is a sectional view of the metallic terminations prior to welding.
Figure 2:
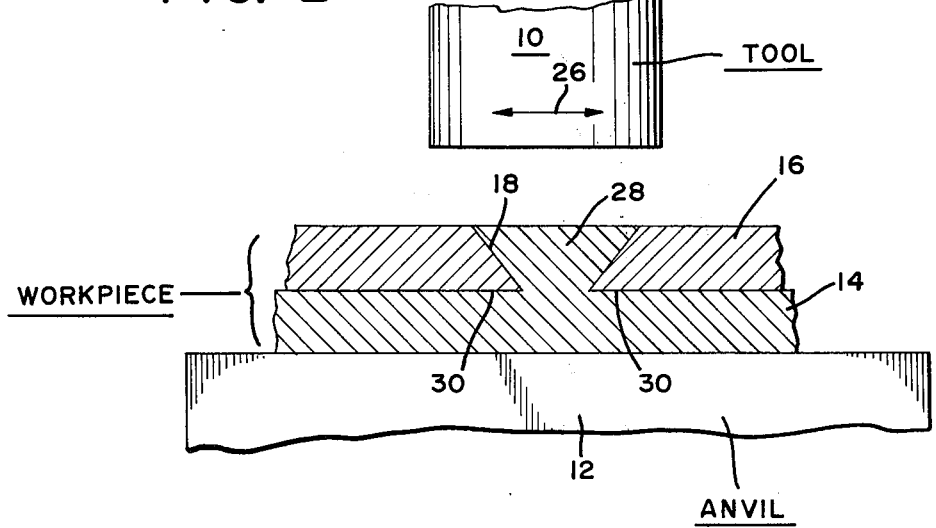
FIG. 2 is a sectional view of the terminations after welding.

Referring now to the drawings and FIG. 1 in particular, there is shown a vibratory tool 10 having a frontal surface 24 for engaging a workpiece and imparting vibratory energy thereto. A stationary anvil 12 with two terminations 14 and 16 made of dissimilar metals are disposed on the anvil for contact by the tool 10. The termination 14 made from the softer metal, for instance aluminum, is disposed on the anvil 12 and the termination 16 made from the harder metal, for instance copper, is superposed on the termination 14. The termination 16 made of the harder metal is provided with an aperture 18 which is aligned underneath the vibratory tool 10. While in the preferred embodiment the aperture 18 shown is tapered with the narrowed end juxtaposed on the termination made of the softer metal, any shaped aperture can be used for providing a weld by the method described herein.

The weld is accomplished when the static clamping force means 20, typically a hydraulically driven piston, urges the two terminations toward engagement with the frontal surface 24 of the tool 10 in the direction of arrow 22 and the tool 10 is excited to vibrate at a sonic or ultrasonic frequency, typically at a high frequency between 1 and 100 kHz, in the direction of arrow 26, that is perpendicular to the direction of the applied clamping force as shown in the patents, supra.

During the weld cycle, the softer metal 14 is caused to flow and extrudes upward into the aperture 18. The motion of the tool 10 levels the metal at the top of the aperture 18. It will be observed that the area of the tool in contact with the termination is larger than the opening of the aperture 18.

At the end of the weld cycle, the tool 10 ceases to vibrate and the static clamping force is removed. The weld made between the two terminations forms a non-fusion metallurgical bond along the interface 30, resulting in a weld characterized by a high shear strength. The improved peel strength is caused by the increased contact surface area between the two terminations. It should be understood that the body 28 forms a bond with the material forming the aperture 18 and is not merely a projection disposed on one termination inserted into an aperture of the other termination.

The process disclosed hereinabove is particularly applicable to electrical conductors of rectangular cross section, but it will be appreciated that the process is useful also for structural members and materials used outside the electrical art.

While there has been described and illustrated, a preferred method for vibratory welding metallic terminations, it shall be apparent to those skilled in the art that further changes and modifications may be made without deviating from the scope of the invention which shall be limited only by the scope of the appended claims.

What is claimed is:

1. The method of producing a welded connection by high frequency vibratory welding comprising the steps of:

superposing an apertured termination upon a non-apertured termination;

disposing said terminations between an anvil and a tool adapted to vibrate at a high frequency;

applying a static clamping force between said terminations for causing the abutting surfaces of said terminations to be in intimate contact with one another, and while said static force is applied causing said tool to undergo high frequency vibrations in a direction normal to said static force whereby to cause material from said non-apertured termination to penetrate into the aperture of said apertured termination, and terminating said vibrations and said force when said material has penetrated into said aperture.

2. The method of producing a welded connection by high frequency vibratory welding as set forth in claim 1 wherein said terminations are of dissimilar metals.

3. The method of producing a welded connection by high frequency vibratory welding as set forth in claim 2 wherein the harder metal comprises said apertured termination.

4. The method of producing a welded connection by high frequency vibratory welding as set forth in claim 3 wherein said aperture is tapered.

5. The method of producing a welded connection by high frequency vibratory welding as set forth in claim 4, wherein the narrower opening of said aperture is juxtaposed upon the other termination.

6. The method of producing a welded connection by high frequency vibratory welding as set forth in claim 3, wherein the frequency of said vibrations is in the range from 1 kHz to 100 kHz.

7. The method of producing a welded connection by high frequency vibratory welding as set forth in claim 3, wherein the frontal surface of said tool has a larger area than the larger opening of the aperture and during welding the tool is in contact with the termination made of the harder metal.

8. The method of producing a welded connection by high frequency vibratory welding as set forth in claim 3, wherein one termination is made of copper and the other termination is made of aluminum.

9. The method of producing a welded connection by high frequency vibratory welding as set forth in claim 1, wherein said terminations comprise electrical conductors.

10. The method of producing a welded connection by high frequency vibratory welding as set forth in claim 9, said terminations have a rectangular cross section.

* * * * *